(12) United States Patent
Zeng et al.

(10) Patent No.: US 8,315,297 B2
(45) Date of Patent: Nov. 20, 2012

(54) METHOD, DEVICE AND COMPUTER PROGRAM FOR CLASSIFYING A RECEIVED SIGNAL

(75) Inventors: Yonghong Zeng, Singapore (SG); Ying-Chang Liang, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 340 days.

(21) Appl. No.: 12/307,071

(22) PCT Filed: Jul. 5, 2007

(86) PCT No.: PCT/SG2007/000198
§ 371 (c)(1),
(2), (4) Date: Oct. 6, 2009

(87) PCT Pub. No.: WO2008/004987
PCT Pub. Date: Jan. 10, 2008

(65) Prior Publication Data
US 2010/0015935 A1    Jan. 21, 2010

(51) Int. Cl.
*H04B 15/00* (2006.01)
*H04B 17/00* (2006.01)
*H04L 27/06* (2006.01)

(52) U.S. Cl. .................. 375/227; 375/340; 702/190
(58) Field of Classification Search .............. 375/224, 375/227, 316, 340; 702/57, 189–191
See application file for complete search history.

(56) References Cited

U.S. PATENT DOCUMENTS

| | | | | |
|---|---|---|---|---|
| H374 H * | 11/1987 | Abo-Zena et al. | ............ | 342/378 |
| 5,333,191 A * | 7/1994 | McCarthy | .................. | 379/386 |
| 6,087,974 A * | 7/2000 | Yu | ................................. | 342/62 |
| 6,377,213 B1 * | 4/2002 | Odachi et al. | .............. | 342/383 |
| 6,985,434 B2 * | 1/2006 | Wu et al. | ...................... | 370/208 |
| 2004/0086161 A1 * | 5/2004 | Sivaramakrishna et al. | .. | 382/131 |

OTHER PUBLICATIONS

Anant Sahai, et al., Spectrum Sensing Fundamental Limits and Practical Challenges, Dyspan, 2005, 1-90, Berkeley, California.

* cited by examiner

*Primary Examiner* — David B. Lugo
(74) *Attorney, Agent, or Firm* — K. David Crockett, Esq.; Niky Economy Syrengelas, Esq.; Crockett & Crockett, PC

(57) ABSTRACT

An embodiment of the invention provides a method for classifying a received signal. The method includes determining a covariance matrix of signal values of the received signal, and determining an eigenvalue matrix of the covariance matrix. The eigenvalue matrix includes the eigenvalues of the covariance matrix. A first function is determined from at least one eigenvalue of the eigenvalues of the covariance matrix. A second function is determined from at least one eigenvalue of the eigenvalues of the covariance matrix, wherein the second function is different from the first function. Dependent from a comparison between a value of the first function and a value of the second function, the received signal is classified into a signal comprising data or into a noise signal.

26 Claims, 11 Drawing Sheets

Probability of detection (WAS-311/48/01)

Probability of detection (WAS-311/36/01)

Probability of detection (WAS-006/34/01)

Probability of detection (WAS-051/35/01)

Probability of detection (WAS-032/48/01)

Probability of detection (WAS-049/34/01)

Probability of detection ($M = 4$, $P = 2$)

Probability of detection ($M = 2, P = 1$)

US 8,315,297 B2

METHOD, DEVICE AND COMPUTER PROGRAM FOR CLASSIFYING A RECEIVED SIGNAL

TECHNICAL FIELD

Embodiments of the invention relate generally to a method for classifying a received signal, in particular, for classifying a received signal into a signal including data or a noise signal. Another embodiment of the invention relates to a classifier and a computer program product.

BACKGROUND

A cognitive radio is able to sense the spectral environment over a wide frequency band and exploit this information to opportunistically provide wireless links that best meet a user's communication requirements. What is unique to cognitive radio operation is the requirement that the radio is able to sense the environment over huge swath of spectrum and adapt to it since the radio does not have primary rights to any pre-assigned frequencies. That is, it is necessary to detect the existence of signals of primary users dynamically.

Energy (EG) detection is a major and basic signal detection method (sensing algorithm). Unlike coherent detection, energy detection does not need any information of the signal to be detected and is robust to unknown multipath fading. However, energy detection is vulnerable to the noise uncertainty, because the method relies on the knowledge of accurate noise power. There are several sources of uncertainty: (1) non-linearity of components; (2) thermal noise in components (non-uniform, time-varying); (3) noise due to transmissions by other users (unintentional (close-by) or intentional (far-away)). Hence, in practice, it is very difficult (virtually impossible) to obtain the accurate noise power.

SUMMARY

An embodiment of the invention provides a method for classifying a received signal. The method includes determining a covariance matrix of signal values of the received signal, and determining an eigenvalue matrix of the covariance matrix. The eigenvalue matrix includes the eigenvalues of the covariance matrix. A first function is determined from at least one eigenvalue of the eigenvalues of the covariance matrix. A second function is determined from at least one eigenvalue of the eigenvalues of the covariance matrix, wherein the second function is different from the first function. Dependent from a comparison between a value of the first function and a value of the second function, the received signal is classified into a signal including data or into a noise signal.

Another embodiment of the invention provides a classifier to classify a received signal. The classifier includes a first determining circuit to determine a covariance matrix of signal values of the received signal, and a second determining circuit to determine an eigenvalue matrix of the covariance matrix. The eigenvalue matrix includes the eigenvalues of the covariance matrix. The classifier also includes a third determining circuit to determine a first function from at least one eigenvalue of the eigenvalues of the covariance matrix, and a fourth determining circuit to determine a second function from at least one eigenvalue of the eigenvalues of the covariance matrix. The second function is determined to be different from the first function. The classifier further includes a classifier circuit to classify the received signal into a signal including data or into a noise signal dependent from a comparison between a value of the first function and a value of the second function.

A further embodiment of the invention provides a computer program product for classifying a received signal. The computer program product is configured to classify the received signal when being executed by a processor. The classifying of the received signal includes determining a covariance matrix of signal values of the received signal, and determining an eigenvalue matrix of the covariance matrix. The eigenvalue matrix includes the eigenvalues of the covariance matrix. A first function is determined from at least one eigenvalue of the eigenvalues of the covariance matrix. And a second function is determined from at least one eigenvalue of the eigenvalues of the covariance matrix, wherein the second function is different from the first function. The received signal is classified into a signal including data or into a noise signal dependent from a comparison between a value of the first function and a value of the second function.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
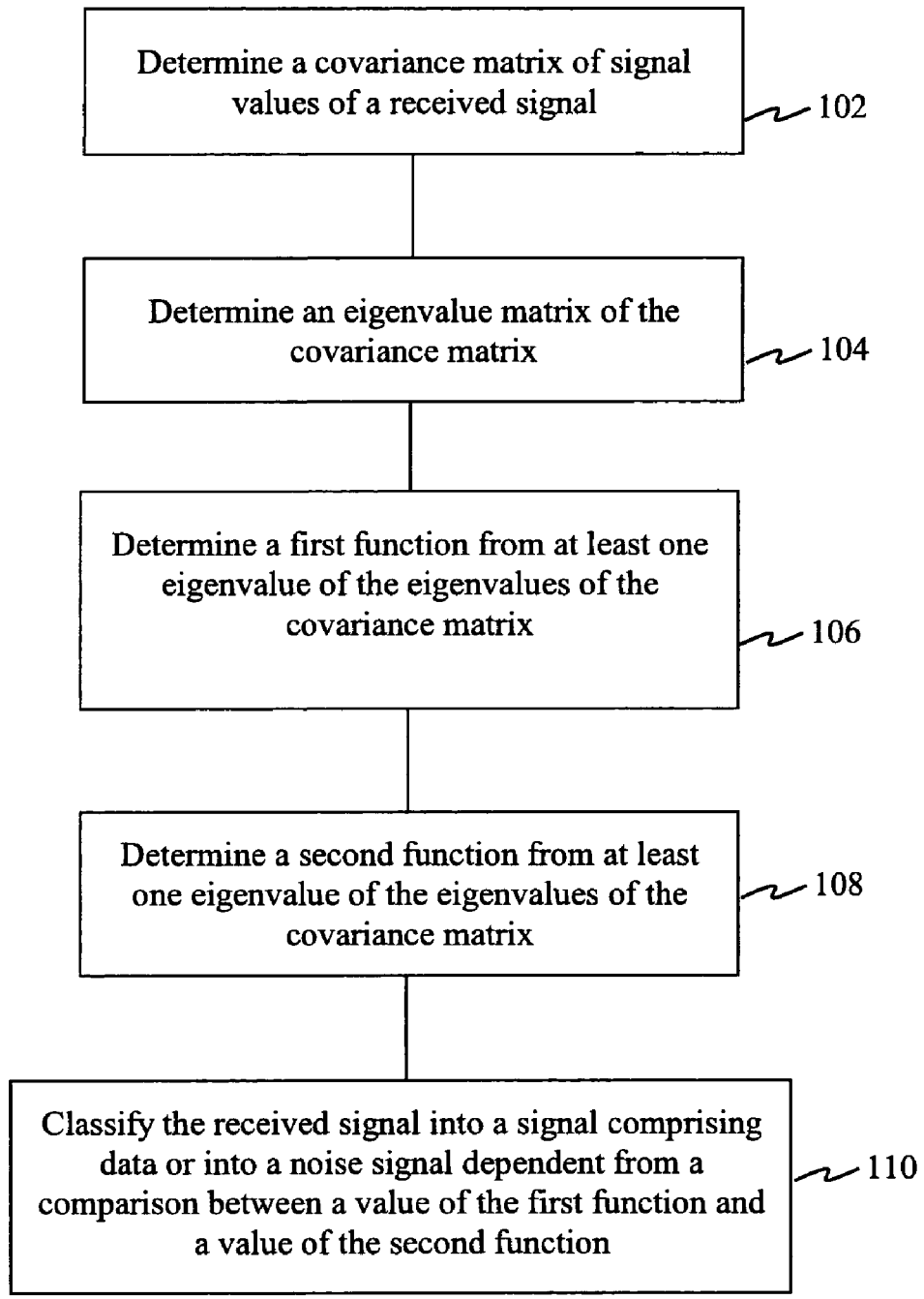
FIG. 1 shows the flowchart illustrating a method in accordance with one embodiment of the invention.

Embodiments of the invention are based on the difference of statistic characteristics between data signal and noise signal. By way of example, depending on the characteristics of the eigenvalue distribution determined from a received signal, an embodiment of the invention classifies the received signal into signal including data or noise signal. The method and device in accordance with various embodiments of the invention may be used in various signal detection applications without knowledge of the signal, the channel and noise power.

An embodiment of the invention relates to a method for classifying a received signal. The method may include determining a covariance matrix of signal values of the received signal, and determining an eigenvalue matrix of the covariance matrix. The eigenvalue matrix includes the eigenvalues of the covariance matrix. A first function is determined from at least one eigenvalue of the eigenvalues of the covariance matrix. A second function is determined from at least one eigenvalue of the eigenvalues of the covariance matrix, wherein the second function is different from the first function. Dependent from a comparison between a value of the first function and a value of the second function, the received signal is classified into a signal including data or into a noise signal.

In one embodiment, the received signal is sampled. For example, the received signal may be a continuous signal, and is sampled by a sampler to be a discrete signal. The sampler may be configured to sample the received signal at a selected sampling rate. In an embodiment when the signal in a frequency band with a predetermined bandwidth is desired, the sampling rate may be selected to be not smaller than the predetermined bandwidth. In another embodiment, the received signal as received by a receiver may be sampled at a sampling rate much higher than the sampling rate for sampling input signal to a receiver.

In one embodiment, the received signal may be filtered by a filter. The filter may be an analog filter or a digital filter. In one embodiment, the filter may be a bandpass filter with a predetermined bandwidth. The filter may be selected to other types of filter as well. In another embodiment, the sampled received signal may be filtered by a filter, which may be an analog filter or a digital filter as well.

According to an embodiment of the invention, the covariance matrix $\underline{R}(N_S)$ of signal values $\underline{x}(n)$ of the received signal is determined according to the following equation:

$$\underline{R}(N_S) = \frac{1}{N_S} \sum_{n=0}^{N_S-1} \underline{x}(n)\underline{x}^H(n),$$

wherein $N_S$ denotes the number of signal values $\underline{x}(n)$ in the covariance matrix. The covariance matrix $\underline{R}(N_S)$ of signal values $\underline{x}(n)$ of the received signal may be determined according to an equation in a different form as well.

The eigenvalue matrix may be determined by transforming the covariance matrix to the eigenvalue matrix, e.g. by decomposing the covariance matrix. In one embodiment, the eigenvalue matrix $\underline{\tilde{R}}(N_S)$ may be determined according to the following formula:

$$\underline{\tilde{R}}(N_S) = \underline{Q}^{-1}\underline{R}(N_S)\underline{Q}^{-H},$$

wherein $\underline{Q}$ denotes a Hermitian matrix. The eigenvalue matrix $\underline{\tilde{R}}(N_S)$ may also be determined according to a formula in a different form in another embodiment of the invention. In one embodiment, the Hermitian matrix $\underline{Q}$ may be determined from a filter for filtering the received signal. In another embodiment, the Hermitian matrix $\underline{Q}$ may be determined from the covariance matrix of noise.

According to an embodiment, the first function is a combination of a plurality of the eigenvalues. In one example, the first function may be a linear combination of a plurality of the eigenvalues, and in another example, the first function may be an non-linear combination of a plurality of the eigenvalues, such as e.g. a quadratic polynomial, a cubic polynomial or a polynomial of even higher degree. In one embodiment, the first function includes at least the maximum eigenvalue of the eigenvalue matrix. In another embodiment, the first function includes a predetermined number of the largest eigenvalues of the eigenvalue matrix, for example, the two, three, four, five, . . . , largest eigenvalues of the eigenvalue matrix.

According to another embodiment, the determining the value of the first function includes determining the trace of the eigenvalue matrix. Thus, the value of the first function is determined to be the trace of the eigenvalue matrix.

The second function may be a combination of a plurality of the eigenvalues, which may be a linear combination or a non-linear combination of a plurality of the eigenvalues, such as e.g. a quadratic polynomial, a cubic polynomial or a polynomial of even higher degree. In one embodiment, the second function includes at least the minimum eigenvalue of the eigenvalue matrix. In another embodiment, the second function includes a predetermined number of the smallest eigenvalues of the eigenvalue matrix, e.g., the two, three, four, five, . . . , smallest eigenvalues of the eigenvalue matrix.

A comparison between the value of the first function and the value of the second function is made using a scaling factor according to an embodiment of the invention. In one embodiment, the scaling factor may be selected to meet the requirement for the probability of false alarm, for example, to achieve a probability of false alarm not higher than a predetermined probability of false alarm. According to one embodiment, if the ratio of the value of the first function to the value of the second function is larger than the selected scaling factor, the received signal is classified as a signal including data. Otherwise, the received signal is classified as a noise signal. The selected scaling factor may be called as a threshold as well.

Another embodiment of the present invention relates to a classifier to classify a received signal. The classifier may include a first determining circuit to determine a covariance matrix of signal values of the received signal, and a second determining circuit to determine an eigenvalue matrix of the covariance matrix. The eigenvalue matrix includes the eigenvalues of the covariance matrix. The classifier may also include a third determining circuit to determine a first function from at least one eigenvalue of the eigenvalues of the covariance matrix, and a fourth determining circuit to determine a second function from at least one eigenvalue of the eigenvalues of the covariance matrix. The second function is determined to be different from the first function. The classifier further includes a classifier circuit to classify the received signal into a signal including data or into a noise signal dependent from a comparison between a value of the first function and a value of the second function.

In the context of this description, a circuit may be understood as including a hard-wired circuit such as e.g. a circuit implemented as an application-specific integrated circuit (ASIC) or a hard-wired logic gate structure, or a programmable circuit such as e.g. a field-programmable gate array (FPGA), or any other programmable logic, e.g. implemented as a microprocessor, being programmed to provide the respective function of the circuit.

In one embodiment, the classifier further includes a sampler to sample the received signal. The sampler may be configured to sample the received signal at a selected sampling rate. In an embodiment when the signal in a frequency band with a predetermined bandwidth is desired, the sampling rate may be selected to be not smaller than the predetermined bandwidth. In another embodiment, the sampler may be configured to sample the received signal at a sampling rate much higher than the sampling rate for sampling input signal to a receiver.

In an embodiment, the classifier includes a filter to filter the received signal. The filter may be an analog filter or a digital filter. In one embodiment, the filter may be selected to a bandpass filter with a predetermined bandwidth. The filter may be selected to other types of filter as well. In another embodiment, the filter is included to filter the sampled received signal.

According to one embodiment, the first determining circuit is configured to determine the covariance matrix $\underline{R}(N_S)$ of signal values $\underline{x}(n)$ of the received signal according to the following equation:

$$\underline{R}(N_S) = \frac{1}{N_S} \sum_{n=0}^{N_S-1} \underline{x}(n)\underline{x}^H(n),$$

wherein $N_S$ denotes the number of signal values $\underline{x}(n)$ in the covariance matrix. The first determining circuit may be configured to determine the covariance matrix of the received signal according to an equation in a different form as well.

According to another embodiment, the second determining circuit is configured to determine the eigenvalue matrix by transforming the covariance matrix to the eigenvalue matrix. In one embodiment, the second determining circuit is configured to determine the eigenvalue matrix $\underline{\tilde{R}}(N_S)$ according to a selected equation. One example of an equation is as follows $$\underline{\tilde{R}}(N_S) = \underline{Q}^{-1}\underline{R}(N_S)\underline{Q}^{-H},$$

wherein $\underline{Q}$ denotes a Hermitian matrix. Different equation may be selected to determine the eigenvalue matrix in other examples. In one embodiment, the Hermitian matrix $\underline{Q}$ may be determined from a filter for filtering the received signal. In another embodiment, the Hermitian matrix $\underline{Q}$ may be determined from the covariance matrix of noise.

The third determining circuit may determine the first function to be a combination of a plurality of the eigenvalues. In one example, the first function may be determined to be a linear combination of a plurality of the eigenvalues, and in another example, the first function may be determined to be an non-linear combination of a plurality of the eigenvalues. In one embodiment, the first function includes at least the maximum eigenvalue of the eigenvalue matrix. In another embodiment, the first function includes a predetermined number of the largest eigenvalues of the eigenvalue matrix, for example, the two, three, four, five, . . . , largest eigenvalues of the eigenvalue matrix.

According to another embodiment, the third determining circuit is configured to determine the value of the first function using the trace of the eigenvalue matrix. Thus, the value of the first function is determined to be the trace of the eigenvalue matrix.

The fourth determining circuit may determine the second function to be a combination of a plurality of the eigenvalues, which may be a linear combination or a non-linear combination of a plurality of the eigenvalues. In one embodiment, the second function includes at least the minimum eigenvalue of the eigenvalue matrix. In another embodiment, the second function includes a predetermined number of the smallest eigenvalues of the eigenvalue matrix, e.g., the two, three, four, five, . . . , smallest eigenvalues of the eigenvalue matrix.

In one embodiment, the classifier circuit is configured to use a scaling factor in the comparison between the value of the first function and the value of the second function. The scaling factor may be selected to meet a predefined criteria. For example, the scaling factor may be selected such that a probability of false alarm not higher than a predetermined probability of false alarm is achieved. According to one embodiment, if the ratio of the value of the first function to the value of the second function is larger than the selected scaling factor, the classifying circuit classifies the received signal as a signal including data. Otherwise, the classifying circuit classifies the received signal as a noise signal.

A further embodiment of the invention relates to an electronic device including the classifier as explained above. In one embodiment, the electronic device further include a receiver to receive a signal. In another embodiment, the electronic device may include multiple receivers to receive a signal.

In one embodiment, the electronic device is configured as an electronic device selected from a group of electronic devices. Examples of the electronic devices include communication terminal or medium player device configured to play at least one medium, e.g., a video player device.

A still further embodiment of the invention relates to a computer program product for classifying a received signal. The computer program product is configured to classify the received signal when being executed by a processor. The classifying of the received signal includes determining a covariance matrix of signal values of the received signal, and determining an eigenvalue matrix of the covariance matrix. The eigenvalue matrix includes the eigenvalues of the covariance matrix. A first function is determined from at least one eigenvalue of the eigenvalues of the covariance matrix. And a second function is determined from at least one eigenvalue of the eigenvalues of the covariance matrix, wherein the second function is different from the first function. The received signal is classified into a signal including data or into a noise signal dependent from a comparison between a value of the first function and a value of the second function.

The computer program product may be implemented in any programming language, such that a plurality of instructions written in a selected programming language may be executed to classify the received signal.

FIG. 1 shows the flowchart illustrating a method in accordance with one embodiment of the invention. Having a received signal, a covariance matrix of signal values of the received signal is determined in 102. An eigenvalue matrix of the covariance matrix is then determined in 104, wherein the eigenvalue matrix includes eigenvalues of the covariance matrix. In 106, a first function is determined from at least one eigenvalue of the eigenvalues of the covariance matrix. And a second function is determined from at least one eigenvalue of the eigenvalues of the covariance matrix in 108. Depending from a comparison between a value of the first function and a value of the second function, the received signal is classified into a signal including data or into a noise signal in 110.

Figure 2:
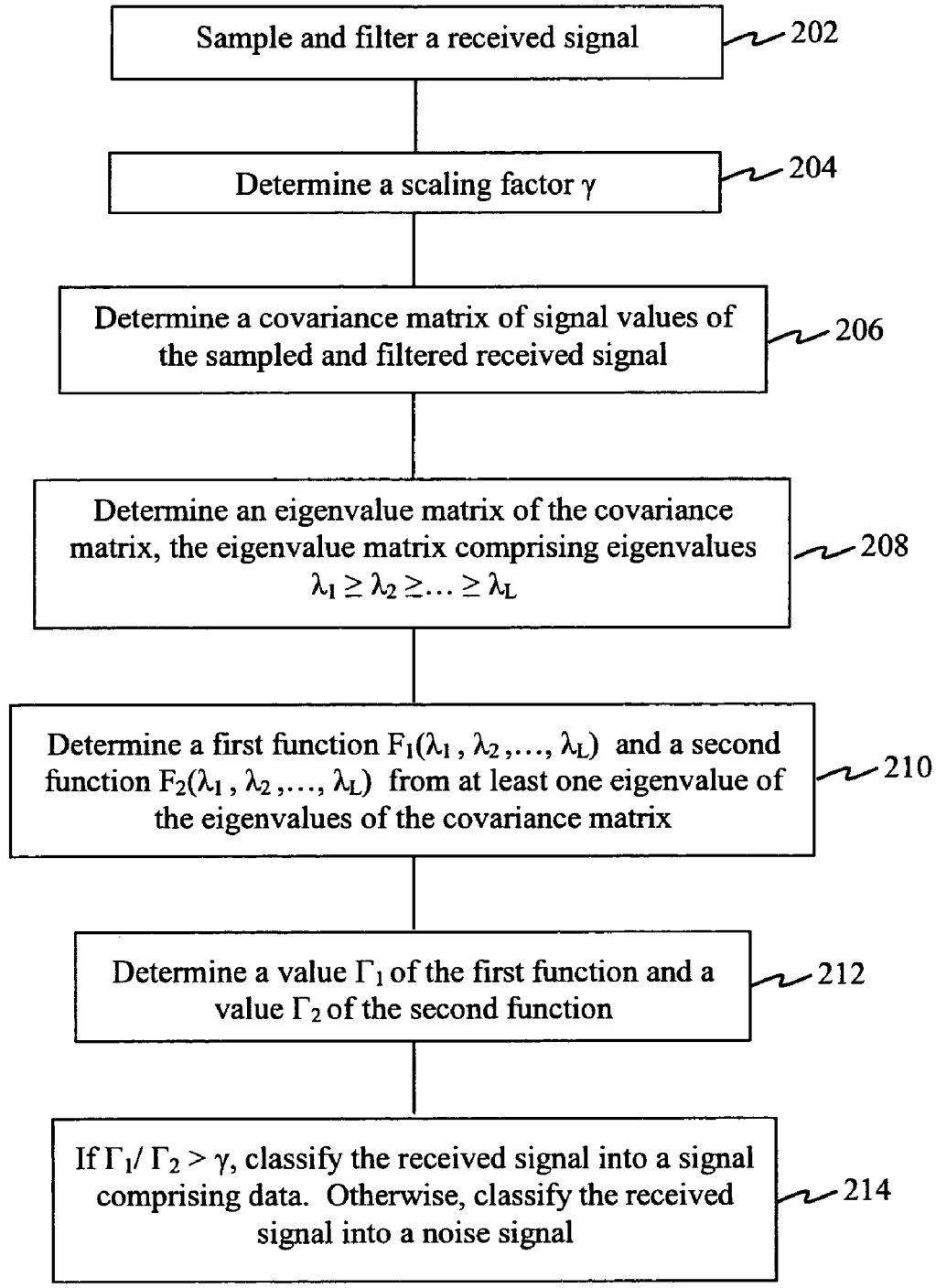
FIG. 2 shows the flowchart illustrating a method in accordance with another embodiment of the invention.

FIG. 2 shows the flowchart illustrating a method in accordance with another embodiment of the invention. The received signal is sampled and filtered in 202. A scaling factor $\gamma$ is then determined in 204. The determination of the scaling factor $\gamma$ may based on a selected smoothing factor and a predetermined probability of false alarm in one embodiment. In 206, a covariance matrix of signal values of the sampled and filtered received signal is determined, and an eigenvalue matrix of the covariance matrix is determined in 208. The eigenvalue matrix includes a plurality of eigenvalues, which are arranged, e.g. in the order of $\lambda_1 \geq \lambda_2 \geq \ldots \geq \lambda_L$. A first function $F_1(\lambda_1, \lambda_2, \ldots, \lambda_L)$ and a second function $F_2(\lambda_1, \lambda_2, \ldots, \lambda_L)$ is determined from at least one eigenvalue of the eigenvalues of the covariance matrix in 210. A value $\Gamma_1$ of the first function and a value $\Gamma_2$ of the second function is then determined in 212. Finally in 214, the value $\Gamma_1$ and $\Gamma_2$ are compared. If $\Gamma_1/\Gamma_2 > \gamma$, the received signal is classified into a signal including data. Otherwise, the received signal is classified into a noise signal.

Figure 3A:
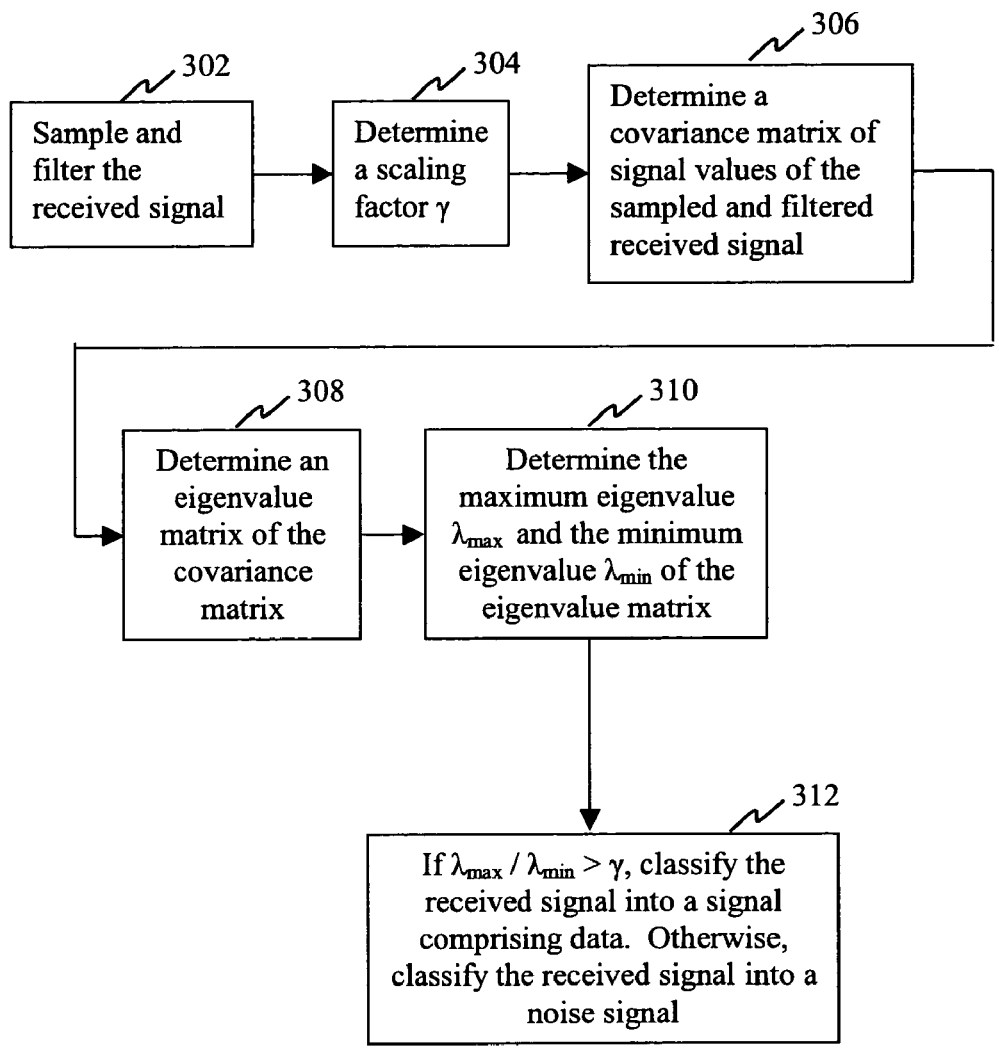
FIGS. 3A and 3B show the flowchart illustrating methods in accordance with the embodiments of the invention.

FIG. 3A shows the flowchart illustrating a method in accordance with an embodiment of the invention. The received signal is sampled and filtered in 302, and a scaling factor $\gamma$ is determined in 304. In 306, a covariance matrix of signal values of the sampled and filtered received signal is determined, and an eigenvalue matrix of the covariance matrix is determined in 308. The eigenvalue matrix includes a plurality of eigenvalues of the covariance matrix. In 310, the maximum eigenvalue $\lambda_{max}$ and the minimum eigenvalue $\lambda_{min}$ are determined. Finally in 312, the eigenvalues $\lambda_{max}$ and $\lambda_{min}$ are compared in order to classify the received signal. If $\lambda_{max}/\lambda_{min} > \gamma$, the received signal is classified into a signal including data. Otherwise, the received signal is classified into a noise signal.

Figure 3B:
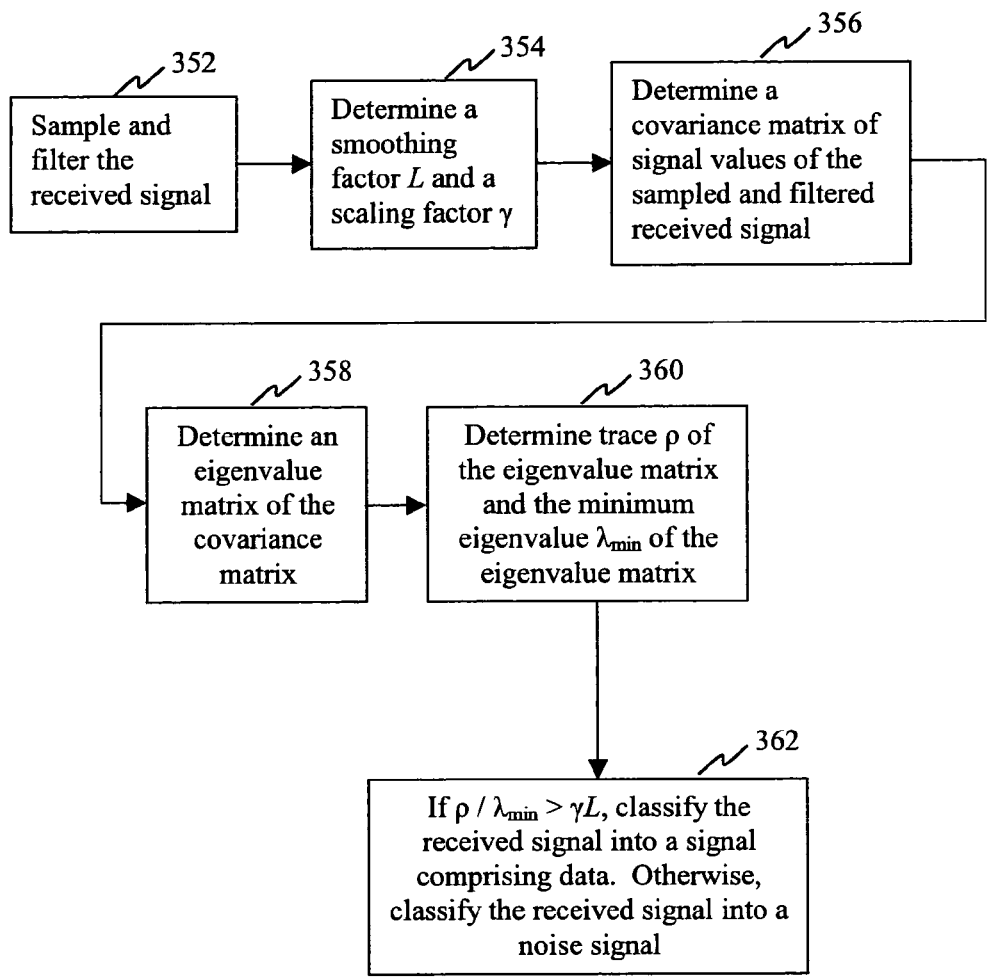

FIG. 3B shows the flowchart illustrating a method in accordance with a further embodiment of the invention. The received signal is sampled and filtered in 352. A smoothing factor L and a scaling factor $\gamma$ are determined in 354, wherein in one embodiment the scaling factor may be determined based on the smoothing factor and a predetermined probability of false alarm. In 356, a covariance matrix of signal values of the sampled and filtered received signal is determined, and an eigenvalue matrix of the covariance matrix is determined in 358. The eigenvalue matrix includes a plurality of eigenvalues of the covariance matrix. In 360, the trace $\rho$ of the eigenvalue matrix and the minimum eigenvalue $\lambda_{min}$ of the eigenvalue matrix are determined. Finally in 362, the trace $\rho$ and the eigenvalue $\lambda_{min}$ are compared so as to classify the received signal. If $\rho/\lambda_{min} > \gamma L$, the received signal is classified into a signal including data. Otherwise, the received signal is classified into a noise signal.

Figure 4:
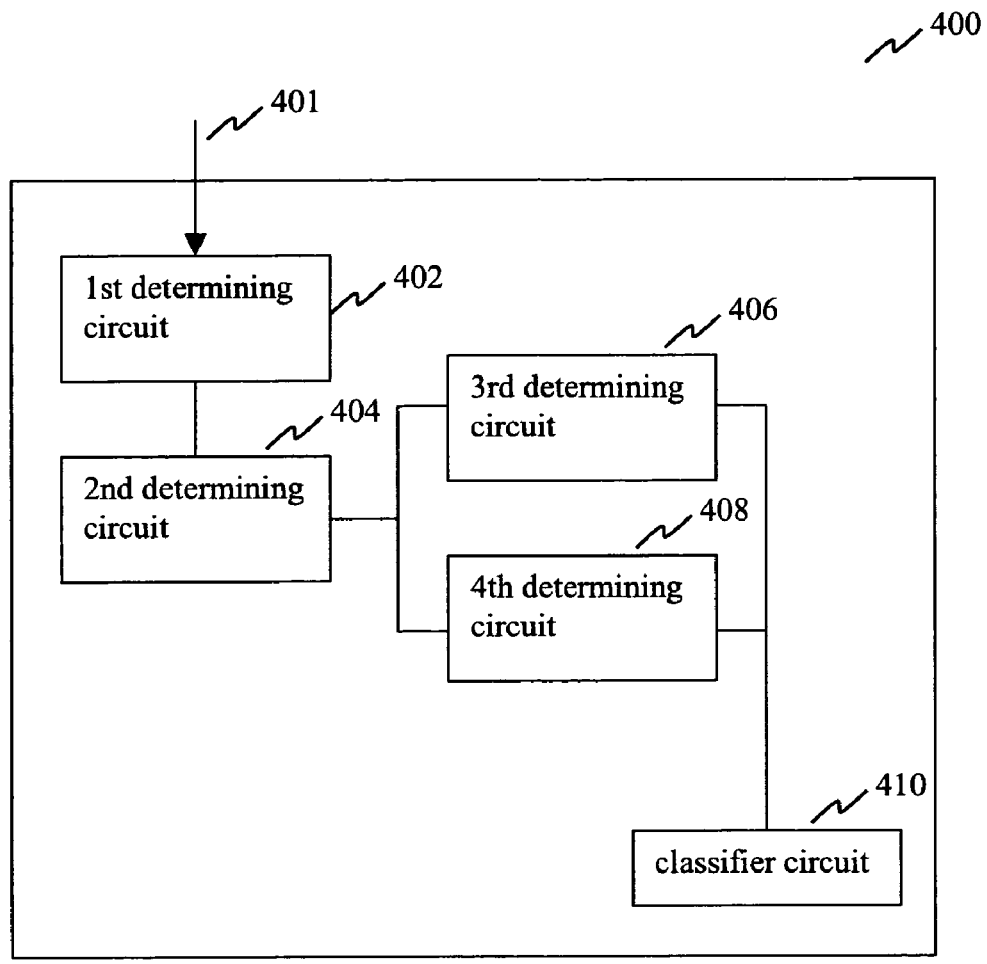
FIG. 4 shows a classifier according to an embodiment of the invention.

FIG. 4 shows a classifier 400 to classify a received signal 401 according to an embodiment of the invention. The classifier 400 may include a first determining circuit 402 to determine a covariance matrix of signal values of the received signal 401, and a second determining circuit 404 to determine an eigenvalue matrix of the covariance matrix. The eigenvalue matrix includes the eigenvalues of the covariance matrix. The classifier 400 may also include a third determining circuit 406 to determine a first function from at least one eigenvalue of the eigenvalues of the covariance matrix, and a fourth determining circuit 408 to determine a second function from at least one eigenvalue of the eigenvalues of the covariance matrix. The second function is determined to be different from the first function. The classifier 400 further includes a classifier circuit 410 to classify the received signal 401 into a signal including data or into a noise signal dependent from a comparison between a value of the first function and a value of the second function.

The classifier 400 and each of the circuit 402, 404, 406, 408, 410 may be a hard-wired circuit or a hard-wired logic gate structure, or a programmable circuit, or any other programmable logic being programmed to provide the respective function of the circuit as explained above. The classifier 400 may be included in an electronic device for classifying a signal received by the electronic device.

In another embodiment, the classifier may be a computer program product including instructions to be configured to classify a received signal according to the embodiments of the invention above when being executed by a processor.

The statistical covariance matrices of signal and noise are generally different. The statistical covariance matrix of noise is determined by the receiving filter. Therefore its structure is known to the receiver. Based on this structure, the covariance matrix of the received signal can be transformed into an eigenvalue matrix. When the received signal is a noise signal, the maximum and minimum eigenvalue of the eigenvalue matrix are equal. However, when the received signal includes data, the maximum, average and minimum eigenvalues of the eigenvalue matrix are different. Based on the so called random matrix theories (RMT), the characteristic of eigenvalue distribution is used for signal detection. Thus, the method in accordance with the embodiment of the invention may be used in various signal detection applications without knowledge of the signal, the channel and noise power.

Example 1

In an illustrative example, let y(t) be the continuous-time received signal. Assuming that the frequency band with central frequency $f_c$ and bandwidth W is desired, the received signal y(t) is sampled at a sampling rate $f_s$, where $f_s \geq W$. Let $T_s = 1/f_s$ be the sampling period. The received discrete signal is then $x(n) = y(nT_s)$. There are two hypothesises: $H_0$: data not exists; and $H_1$: data exists. The received signal samples under the two hypothesises are therefore respectively as follows:

$$H_0: x(n) = \eta(n)$$

$$H_1: x(n) = s(n) + \eta(n),$$

where s(n) is the transmitted signal, e.g. passing through a wireless channel (including fading and multipath effect), and $\eta(n)$ is the white noise samples. Note that s(n) can be the superposition of multiple signals.

The received signal is generally passed through a bandpass filter. Let f(k), k=0, 1, ..., K be the bandpass filter with $$\sum_{k=0}^{K} |f(k)|^2 = 1.$$

Let g(n) be the auto-correlation of the filter, that is, $$g(n) = \sum_{k=0}^{K} f^*(k) f(n+k), n = 0, 1, \ldots, K$$

Define $$\mu(N) = N|g(0)|^2 + 2 \sum_{n=1}^{K} (N-n)|g(n)|^2$$

After filtering, the received signal is turned to $$\tilde{x}(n) = \sum_{k=0}^{K} f(k) x(n-k), n = 0, 1, \ldots$$

Let $$\tilde{s}(n) = \sum_{k=0}^{K} f(k) s(n-k), n = 0, 1, \ldots$$

$$\tilde{\eta}(n) = \sum_{k=0}^{K} f(k) \eta(n-k), n = 0, 1, \ldots$$

Then $$H_0: \tilde{x}(n) = \tilde{\eta}(n)$$

$$H_1: \tilde{x}(n) = \tilde{s}(n) + \tilde{\eta}(n)$$

Choose a smoothing factor L and define $$\underline{x}(n) = [\tilde{x}(n) \tilde{x}(n-1) \ldots \tilde{x}(n-L+1)]^T, n=0,1,\ldots,N_s-1$$

Wherein $N_s$ denotes the number of signal values $\underline{x}(n)$.

Define a L×(L+K) matrix as $$H = \begin{bmatrix} f(0) & f(1) & \ldots & f(K) & 0 & \ldots & 0 \\ 0 & f(0) & \ldots & f(K-1) & f(K) & \ldots & 0 \\ & & \ldots & & \ldots & & \\ 0 & 0 & \ldots & f(0) & f(1) & \ldots & f(K) \end{bmatrix}$$

Let $\underline{G}=\underline{H}\underline{H}^H$. Decompose the matrix into $\underline{G}=\underline{Q}\underline{Q}^H$, where $\underline{Q}$ is a L×L Hermitian matrix.

The method to classify the received signal according to one embodiment of the invention is illustrated in the following steps:

Step 1. Sample and filter the received signal as described above.

Step 2. Choose a smoothing factor L and determine a scaling factor γ (also referred to as a threshold), wherein the scaling factor γ should be determined to meet the requirement for the probability of false alarm.

Step 3. Determine a covariance matrix $\underline{R}(N_S)$ of the signal values of the received signal as follows:

$$\underline{R}(N_s) = \frac{1}{N_s} \sum_{n=0}^{N_s-1} \underline{x}(n)\underline{x}^H(n)$$

Step 4. Determine an eigenvalue matrix $\underline{\tilde{R}}(N_S)$ by transforming the covariance matrix according to the following equation $$\underline{\tilde{R}}(N_s) = \underline{Q}^{-1}\underline{R}(N_s)\underline{Q}^{-H}$$

Step 5. Determine the eigenvalues of the eigenvalue matrix of the received signal and denote them as $\lambda_1 \geq \lambda_2 \geq \ldots \geq \lambda_L$.

Step 6. Determine a first function $F_1$ and a second function $F_2$ from the at least one eigenvalues:

$$\Gamma_1(N_s) = F_1(\lambda_1, \lambda_2, \ldots, \lambda_L)$$

$$\Gamma_2(N_s) = F_2(\lambda_1, \lambda_2, \ldots, \lambda_L)$$

where $F_1$ and $F_2$ are positive functions with L variables, and $\Gamma_1(N_s)$ and $\Gamma_2(N_s)$ are the respective value of the first and the second function. The functions $F_1$ and $F_2$ may be a combination of the plurality of eigenvalues, e.g. a linear combination. The functions $F_1$ and $F_2$ may also include a plurality of the largest and the smallest eigenvalues, respectively.

Step 7. Classify the received signal dependent from a comparison between $\Gamma_1(N_s)$ and $\Gamma_2(N_s)$. If $\Gamma_1(N_s)/\Gamma_2(N_s) > \gamma$, signal exists (i.e., the received signal includes data). Otherwise, signal not exists (i.e., the received signal is a noise signal).

Example 2

This example is referred to as maximum-minimum eigenvalue (MME) detection, wherein the comparison of the maximum eigenvalue with the minimum eigenvalue is used to classify a received signal, and is explained as follows.

Step 1. Sample and filter the received signal as described in Example 1 above.

Step 2. Choose a smoothing factor L and determine a scaling factor γ (also referred to as a threshold). The scaling factor γ is determined to meet the requirement for the probability of false alarm according to the following equation:

$$\gamma = \frac{(\sqrt{N_s} + \sqrt{L})^2}{(\sqrt{N_s} - \sqrt{L})^2}\left(1 + \frac{(\sqrt{N_s} + \sqrt{L})^{-2/3}}{(N_s L)^{1/6}} F_1^{-1}(1-P_0)\left(\frac{\mu(N_s)}{N_s}\right)^\alpha\right) \quad (1)$$

where $F_1$ is the so called Tracy-Wisdom distribution of order 1, $P_0$ is the predetermined probability of false alarm, and α is a positive number. α should be chosen to meet the requirement for the probability of false alarm. The values of the Tracy-Wisdom distribution are given in Table 1.

TABLE 1

Numerical table for the Tracy-Wisdom distribution of order 1

| t | −3.90 | −3.18 | −2.78 | −1.91 | −1.27 | −0.59 | 0.45 | 0.98 | 2.02 |
|---|---|---|---|---|---|---|---|---|---|
| $F_1(t)$ | 0.01 | 0.05 | 0.10 | 0.30 | 0.50 | 0.70 | 0.90 | 0.95 | 0.99 |

The determination of equation (1) for the scaling factor will be described in a later portion.

Step 3. Determine the covariance matrix:

$$\underline{R}(N_s) = \frac{1}{N_s} \sum_{n=0}^{N_s-1} \underline{x}(n)\underline{x}^H(n)$$

Step 4. Transform the covariance matrix to determine the eigenvalue matrix:

$$\underline{\tilde{R}}(N_s) = \underline{Q}^{-1}\underline{R}(N_s)\underline{Q}^{-H}$$

Step 5. Determine the maximum eigenvalue and minimum eigenvalue of the eigenvalue matrix $\underline{\tilde{R}}(N_s)$ and denote them as $\lambda_{max}$ and $\lambda_{min}$, respectively.

Step 6. Determine the presence of the signal based on a comparison of the maximum eigenvalue and the minimum eigenvalue. If $\lambda_{max}/\lambda_{min} > \gamma$, signal exists. Otherwise, signal does not exist.

Example 3

Since the average value of the eigenvalues is proportional to the trace of the covariance matrix, the trace may be compared with the minimum eigenvalue to detect whether the received signal includes data or not. This embodiment of the invention is called the trace with minimum eigenvalue (TME) detection, which is explained in detail below. TME detection is also referred to as the energy with minimum eigenvalue (EME) detection, since the trace represents the average energy.

Step 1. Sample and filter the received signal as described in Example 1 above.

Step 2. Choose a smoothing factor L and determine a scaling factor γ (also referred to as a threshold). The scaling factor γ is determined to meet the requirement for the probability of false alarm.

Step 3. Determine the covariance matrix:

$$\underline{R}(N_s) = \frac{1}{N_s} \sum_{n=0}^{N_s-1} \underline{x}(n)\underline{x}^H(n)$$

Step 4. Transform the covariance matrix to determine the eigenvalue matrix:

$$\tilde{R}(N_s) = \underline{Q}^{-1} \underline{R}(N_s) \underline{Q}^{-H}$$

Step 5. Determine the trace ρ of the covariance matrix of the received signal, and the minimum eigenvalue $\lambda_{min}$ of the eigenvalue matrix $\tilde{R}(N_s)$.

Step 6. Determine the presence of the signal based on a comparison of the trace and the minimum eigenvalue. If $\rho/\lambda_{min} > \gamma L$, the received signal is classified to include data. Otherwise, the received signal is classified to a noise signal.

Simulations for wireless microphone signal and for DTV signals using the methods in according with the embodiments of the invention in Example 2 and Example 3 above are presented in the following.

Simulation for Wireless Microphone Signal

In an embodiment of the invention, the FM modulated wireless microphone signal can be written as $$w(t) = \cos\left(2\pi \int_0^t (f_c + f_\Delta w_m(\tau)) d\tau\right)$$

where $f_c$ is the central frequency, $f_\Delta$ is the frequency deviation, and $w_m(\tau)$ is the source signal.

The frequency deviation is chosen to be 100 KHZ. $w_m(\tau)$ is generated as evenly distributed real number in (−1,1). We assume that the signal has been down converted to the IF (Intermediate Frequency) with central frequency $f_{IF} = 5.381119$ MHz. The sampling rate is 21.524476 MHz. The passband filter with bandwidth 6 MHz is the raised cosine filter with 89 tapes. The signal and white noise are passed through the same filter. Sensing time is 9.30 milliseconds (ms). The smoothing factor is chosen as L=10. The scaling factor or the threshold is set based on the predetermined required probability of false alarm $P_{fa} = 0.1$ (based on random matrix theory), which is fixed for signals. The scaling factor is not related to noise power.

Figure 5:
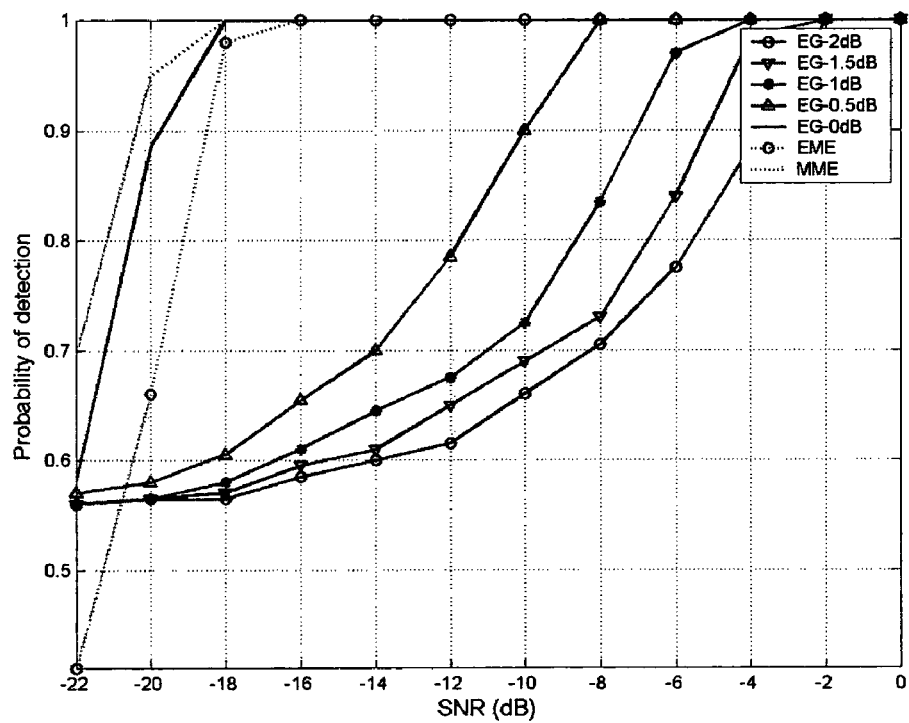
FIG. 5 shows the probability of detection resulting from a simulation on wireless microphone signal.
Figure 6A:
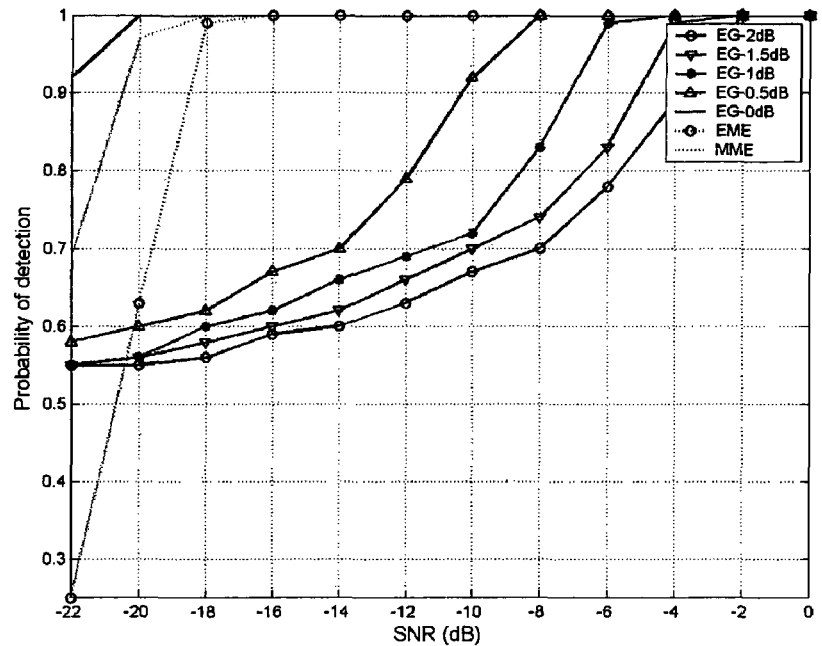
FIGS. 6A-6F shows the probability of detection resulting from the simulation on different DTV signals.
Figure 6B:
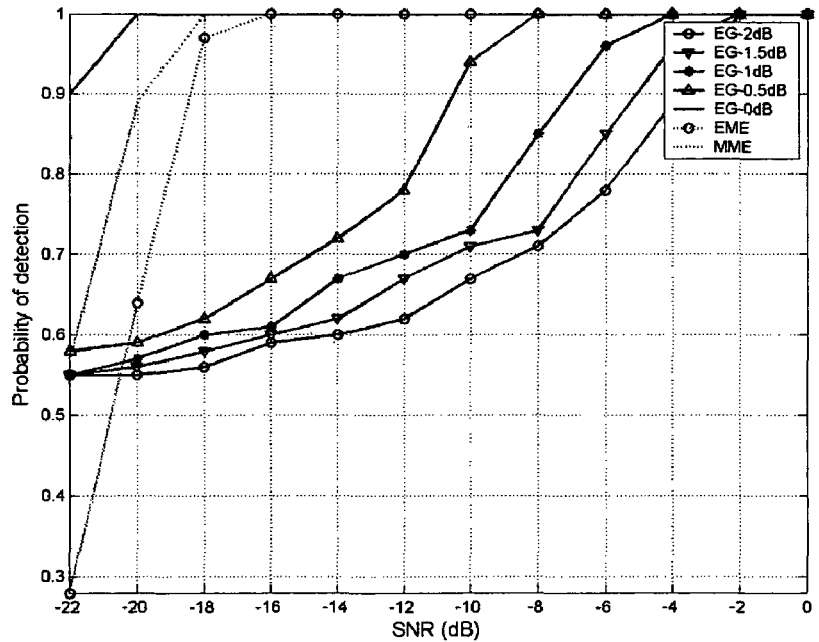
Figure 6C:
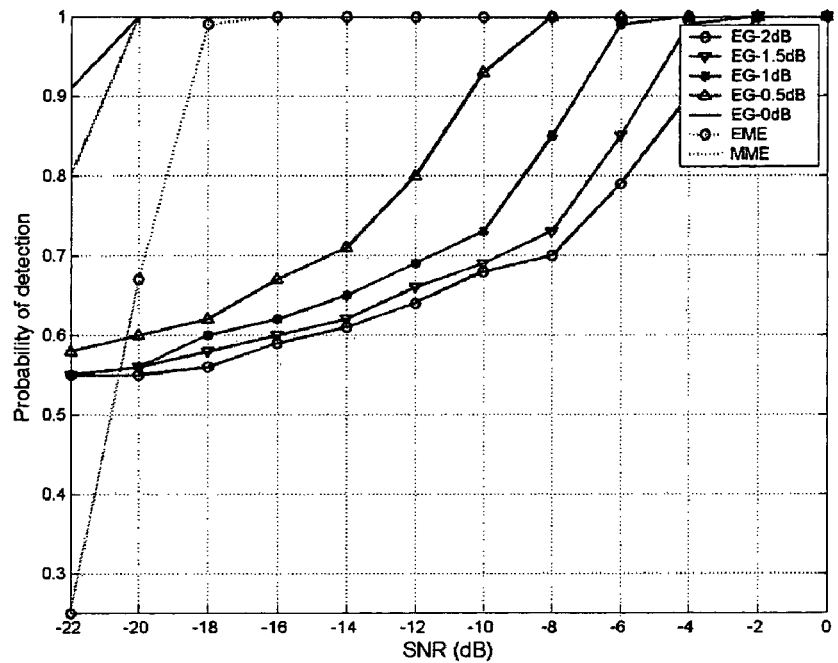
Figure 6D:
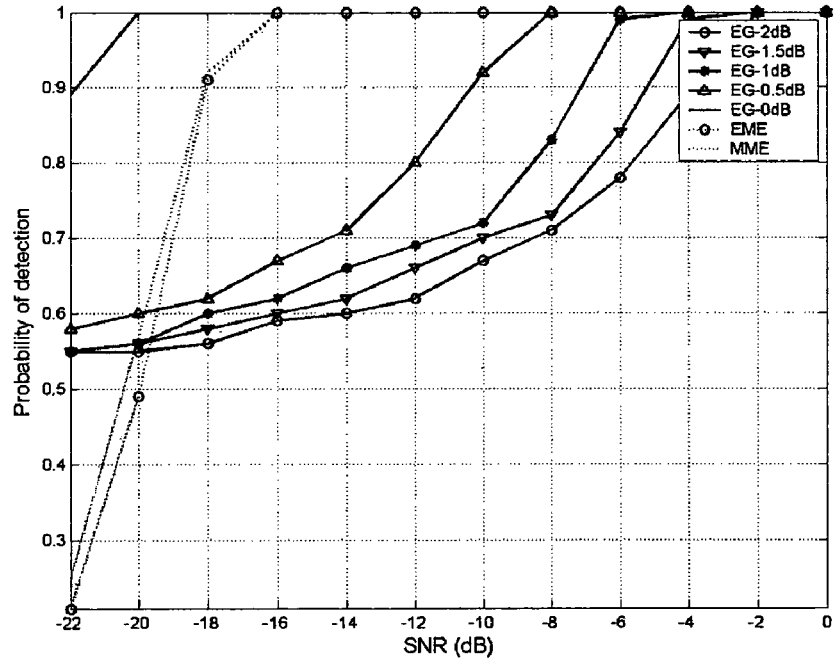
Figure 6E:
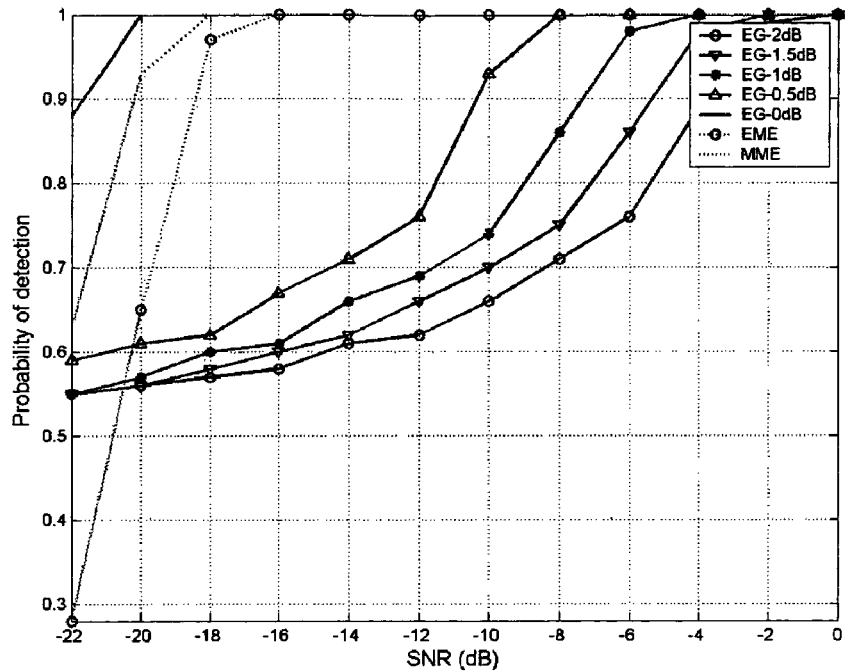
Figure 6F:
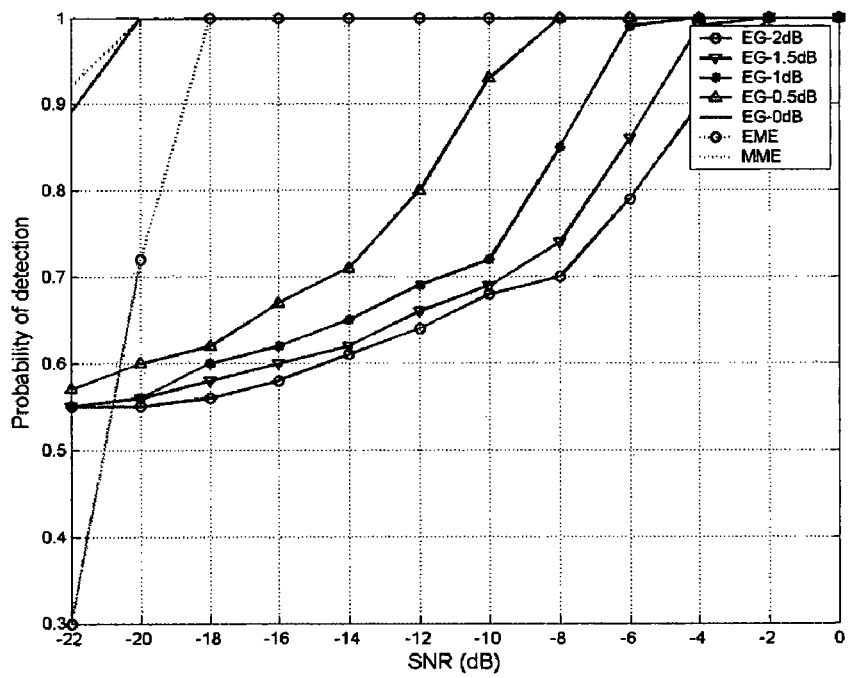

FIG. 5 shows the probability of detection resulting from the simulation, wherein "EG-xdB" means the energy detection with x-dB noise uncertainty. Table 2 below shows the probability of false alarm resulting from the method of energy detection and the method according to the embodiments of the invention, wherein MME is the maximum-minimum detection in Example 2 above and TME is the trace with minimum eigenvalue detection in Example 3 above.

TABLE 2

Probability of false alarm (sensing time 9.63 ms)

| EG-2 dB | EG-1.5 dB | EG-1 dB | EG-0.5 dB | EG-0 dB (no uncertainty) | TME/EME | MME |
|---|---|---|---|---|---|---|
| 0.497 | 0.497 | 0.496 | 0.483 | 0.108 | 0.081 | 0.086 |

From the simulation results in FIG. 5 and Table 2, it is shown that the method in accordance with an embodiment of the invention achieves higher probability of detection and lower probability of false alarm than the method of energy detection. In FIG. 5, the MME even performs better than the energy detection with exact noise power (without noise uncertainty). In practice, noise uncertainty is usually present. As shown in FIG. 5, if there is higher than 0.5 dB noise uncertainty, the detection probability of the energy detection is much worse than that of the method according to the embodiments of the invention.

Furthermore, the probability of false alarm for the method in accordance with the embodiments of the invention and the method of energy detection without noise uncertainty meet the requirement for the probability of false alarm ($P_{fa} <= 0.1$). However, the resulting probability of false alarm for the energy detection method with noise uncertainty far exceeds the limit as shown in Table 2. Therefore, the method of energy detection is unreliable in practical situations with noise uncertainty compared with the method in accordance with the embodiments of the invention.

Simulations for Captured DTV Signals

The simulations are based on the "Spectrum sensing simulation model".

The captured DTV signal is passed through a raised cosine filter (bandwidth 6 MHz, rolling factor ½, 89 tapes). White noises are added to obtain the various SNR levels. The number of samples used is 400000 (corresponding to 18.60 ms). The smoothing factor is chosen as L=10. The threshold is set based on the required $P_{fa}=0.1$ (using random matrix theory), which is fixed for signals. The threshold is not related to noise power.

Table 3 shows the probability of false alarm resulting from the method of energy detection and the method in accordance with the embodiments of the invention. FIGS. 6A to 6F show the probability of detection for different DTV signals.

TABLE 3

Probability of false alarm (white noise, sensing time 18.60 ms)

| EG-2 dB | EG-1.5 dB | EG-1 dB | EG-0.5 dB | EG-0 dB (no uncertainty) | TME/EME | MME |
|---|---|---|---|---|---|---|
| 0.496 | 0.496 | 0.491 | 0.481 | 0.095 | 0.029 | 0.077 |

From the simulations results from Table 3 and FIGS. 6A to 6F, it is shown that the TME/EME and the MME method in accordance with the embodiments of the invention have a better performance than the method of energy detection.

Thus, in an embodiment of the invention, it is provided to sense or detect a signal in a radio or communication system, e.g. to detect the existence of data in a received signal without the prior knowledge of the signal, the channel the signal is residing in and the noise power of the received signal.

In the following, the embodiment of the invention in a multiple-input multiple-output (MIMO) system is illustrated in Example 4.

Example 4

Assume that there are P signals $s_j(n)$, (j=1, 2, ..., P) and M receivers. This is also applicable to single receiver case if the received signal is sampled at the sampling rate of M times the sampling rate of the input signals, i.e., the received signal is oversampled. In the following, the two situations are treated as the same. The received signal for receiver i is $x_i(n)$, (i=1, 2, ..., M), $$x_i(n) = \sum_{j=1}^{P} \sum_{k=0}^{N_{ij}} h_{ij}(k) s_j(n-k) + \eta_i(n),$$
$$n = 0, 1, ...$$

where $h_{ij}(k)$ is the channel response from user j to antenna i, $N_{ij}$ is the order of channel $h_{ij}(k)$, and $\eta_i(n)$ is the channel noise. Note that the signal, channel response and noise can be either real or complex numbers. Let $$N_j \stackrel{def}{=} \max_i (N_{ij}),$$

zero-padding $h_{ij}(k)$ if necessary, and define $$\underline{x}(n) \stackrel{def}{=} [x_1(n), x_2(n), ..., x_M(n)]^T,$$
$$\underline{h}_j(n) \stackrel{def}{=} [h_{1j}(n), h_{2j}(n), ..., h_{Mj}(n)]^T,$$
$$\underline{\eta}(n) \stackrel{def}{=} [\eta_1(n), \eta_2(n), ..., \eta_M(n)]^T,$$

The expression of $$x_i(n) = \sum_{j=1}^{P} \sum_{k=0}^{N_{ij}} h_{ij}(k) s_j(n-k) + \eta_i(n),$$
$$n = 0, 1, ...$$

may be written into vector form as $$\underline{x}(n) = \sum_{j=1}^{P} \sum_{k=0}^{N_j} \underline{h}_j(k) s_j(n-k) + \underline{\eta}(n),$$
$$n = 0, 1, ...$$

Considering L consecutive outputs and define $$\underline{\hat{x}}(n) \stackrel{def}{=} [\underline{x}^T(n), \underline{x}^T(n-1), ..., \underline{x}^T(n-L+1)]^T,$$
$$\underline{\hat{\eta}}(n) \stackrel{def}{=} [\underline{\eta}^T(n), \underline{\eta}^T(n-1), ..., \underline{\eta}^T(n-L+1)]^T,$$

$$\hat{s}(n) \stackrel{def}{=} \begin{bmatrix} s_1(n), & s_1(n-1), & ..., & s_1(n-N_1-L+1), & ..., \\ s_P(n), & s_P(n-1), & ..., & s_P(n-N_P-L+1) \end{bmatrix}^T$$

Then $\underline{\hat{x}}(n) = \underline{\underline{H}} \hat{s}(n) + \underline{\hat{\eta}}(n)$
Where $\underline{\underline{H}}$ is an $$ML \times (N+PL) \left( N \stackrel{def}{=} \sum_{j=1}^{P} N_j \right)$$

matrix defined as $$\underline{\underline{H}} \stackrel{def}{=} [H_1, H_2, ..., H_P,],$$

$$\underline{\underline{H}}_j \stackrel{def}{=} \begin{bmatrix} \underline{h}_j(0) & ... & ... & \underline{h}_j(N_j) & 0 & ... & 0 \\ 0 & \underline{h}_j(0) & ... & ... & \underline{h}_j(N_j) & ... & 0 \\ & & \ddots & & & \ddots & \\ 0 & 0 & ... & \underline{h}_j(0) & ... & ... & \underline{h}_j(N_j) \end{bmatrix}$$

The following assumptions for the statistical properties of transmitted symbols and channel noise are made:
(1) noise is white noise,
(2) noise and transmitted data signal are uncorrelated Let $\underline{R}(N_s)$ be the sample covariance matrix of the received signal as follows:

$$\underline{R}(N_s) \stackrel{def}{=} \frac{1}{N_s} \sum_{n=L}^{L-1+N_s} \underline{\hat{x}}(n) \underline{\hat{x}}^H(n)$$

where $N_s$ is the number of collected samples. If $N_s$ is large, based on the assumptions (1) and (2) above, it can be verified that $$\underline{R}(N_s) \approx \underline{R} \stackrel{def}{=} E(\underline{\hat{x}}(n) \underline{\hat{x}}^H(n)) = HR_s H^H + \sigma_\eta^2 I_{ML}$$

where $R_s$ is the statistical covariance matrix of the input signal, $\overline{R}_s = E(\hat{s}(n)\hat{s}^H(n))$, $\sigma_\eta^2$ is the variance of the noise, and $I_{ML}$ is the identity matrix of order ML.

Let the eigenvalues of R and $HR_sH^H$ be $\lambda_1 \geq \lambda_2 \geq ... \geq \lambda_{ML}$ and $\rho_1 \geq \rho_2 \geq ... \geq \rho_{ML}$, respectively. Obviously, $\lambda_n = \rho_n + \sigma_\eta^2$. If there is no signal, i.e., $\hat{s}(n)=0$, $\lambda_1 = \lambda_2 = ... = \lambda_{ML} = \sigma_\eta^2$. If there is signal, $\rho_1 > \rho_{ML}$ and therefore $\lambda_1 > \lambda_{ML}$. Thus, by determining if $\lambda_1/\lambda_{ML} > \gamma$ (where $\gamma$ is a threshold), the existence of signal can be detected.

The method to classify the received signal according to the maximum-minimum eigenvalue (MME) detection of an embodiment of the invention is illustrated in the following steps:

Step 1. Determine a covariance matrix $R(N_S)$ of the signal values of the received signal as follows:

$$\underline{R}(N_s) = \frac{1}{N_s} \sum_{n=L}^{L-1+N_s} \underline{\hat{x}}(n) \underline{\hat{x}}^H(n)$$

Step 2. Determine the maximum and minimum eigenvalues of the covariance matrix $R(N_S)$, i.e. $\lambda_{max}$ and $\lambda_{min}$.

Step 3. Classify the received signal dependent from a comparison between the maximum and minimum eigenvalues. If $\lambda_{max}/\lambda_{min} > \gamma$, signal exists (i.e., the received signal includes data). Otherwise, signal does not exist (i.e., the received signal is a noise signal). Here $\gamma > 1$ and the determination of $\gamma$ is explained in the following.

Determination of the Scaling factor or Threshold $\gamma$

In practice, usually only finite number of samples are available. Hence, the sample covariance matrices $\overline{R}(N_S)$ may be well away from the statistical covariance matrices R. The eigenvalue distribution of $\overline{R}(N_S)$ becomes very complicated. Let $P_d$ be the probability of detection, that is, if there is signal, the probability of "yes" determination that the received signal includes data. Let $P_{fa}$ be the probability of false alarm, that is, if there is no signal, the probability of "yes" determination that the received signal includes data. For a good detection algorithm, $P_d$ should be high and $P_{fa}$ should be low. Obviously, the larger the threshold $\gamma$ is, the lower the $P_{fa}$ is, but at the same time, the lower the $P_d$ is. It is a kind of "zero-sum" game. The choice of the threshold $\gamma$ is a compromise between the $P_d$ and $P_{fa}$. In the method according to the embodiment of the invention, a limit for $P_{fa}$ is set, that is, $P_{fa} \leq P_0$. Then a limit threshold $\gamma_0$ can be determined such that $P_{fa} = P_0$. Therefore, the threshold satisfying $\gamma \geq \gamma_0$ can be determined to be the threshold or the scaling factor used in the above examples 1-4 according to the embodiments of the invention. In the following, the determination of $\gamma_0$ is explained.

When there is no signal, $\overline{R}(N_S)$ becomes $\overline{R}_\eta(N_S)$, the sample covariance matrix of the noise is defined as, $$\underline{R}_\eta(N_s) = \frac{1}{N_s} \sum_{n=L}^{L-1+N_s} \hat{\eta}(n)\hat{\eta}^H(n)$$

$\underline{R}_\eta(N_S)$ is a special Wishart random matrix. The study of spectral (eigenvalue distributions) of random matrix is a very hot topic in recent years in mathematics as well as communication and physics. The joint probability density function (PDF) of ordered eigenvalues of the random matrix $\underline{R}_\eta(N_S)$ has been known. However, since the expression of the PDF is very complicated, no closed form expression has been found for the marginal PDF of ordered eigenvalues. The distribution of the largest eigenvalue for real and complex matrix, respectively, may be described in the following theorems.

Theorem 1. Assume that the noise is real. Let $$A(N_s) = \frac{N_s}{\sigma_\eta^2} \underline{R}_\eta(N_S), \mu = \left(\sqrt{N_s - 1} + \sqrt{ML}\right)^2 \text{ and}$$

$$v = \left(\sqrt{N_s - 1} + \sqrt{ML}\right)\left(\frac{1}{\sqrt{N_s - 1}} + \frac{1}{\sqrt{ML}}\right)^{1/3}.$$

Assume that $$\lim_{N_s \to \infty} \frac{ML}{N_s} = y \ (0 < y < 1), \text{ then } \frac{\lambda_{max}(A(N_s)) - \mu}{v}$$

converges (with probability one) to the Tracy-Wisdom distribution of order 1 (W1).

Theorem 2. Assume that the noise is complex. Let $$A(N_s) = \frac{N_s}{\sigma_\eta^2} \underline{R}_\eta(N_S), \mu' = \left(\sqrt{N_s} + \sqrt{ML}\right)^2$$

and $$v' = \left(\sqrt{N_s} + \sqrt{ML}\right)\left(\frac{1}{\sqrt{N_s}} + \frac{1}{\sqrt{ML}}\right)^{1/3}.$$

Assume that $$\lim_{N_s \to \infty} \frac{ML}{N_s} = y \ (0 < y < 1), \text{ then } \frac{\lambda_{max}(A(N_s)) - \mu'}{v'}$$

converges (with probability one) to the Tracy-Wisdom distribution of order 2 (W2).

Note that for large $N_s$, $\mu$ and $\mu'$, $v$ and $v'$ are almost the same. That means, the mean and variance for the largest eigenvalue of real and complex matrix are almost the same. However, their limit distributions are different.

The limit of the smallest eigenvalue may be described in the following theorem 3.

Theorem 3. Assume that $$\lim_{N_s \to \infty} \frac{ML}{N_s} = y \ (0 < y < 1) \text{ then } \lim_{N_s \to \infty} \lambda_{min} = \sigma_\eta^2 \left(1 - \sqrt{y}\right)^2.$$

Here, the ML is treated as fixed and $N_s$ tends to be infinite. Based on the theorems, the following results may be obtained:

$$\lambda_{max} \approx \frac{\sigma_\eta^2}{N_s}\left(\sqrt{N_s} + \sqrt{ML}\right)^2$$

$$\lambda_{min} \approx \frac{\sigma_\eta^2}{N_s}\left(\sqrt{N_s} + \sqrt{ML}\right)^2$$

Let $F_1$ be the cumulative distribution function (CDF) (sometimes simply called distribution function) of the Tracy-Wisdom distribution of order 1. Then, for real signal, the probability of false alarm is $$P_{fa} = P(\lambda_{max} > \gamma \lambda_{min})$$

$$= P\left(\frac{\sigma_\eta^2}{N_s} \lambda_{max}(A(N_s)) > \gamma \lambda_{min}\right)$$

$$\approx P\left(\lambda_{max}(A(N_s)) > \gamma\left(\sqrt{N_s} - \sqrt{ML}\right)^2\right)$$

$$= P\left(\frac{\lambda_{max}(A(N_s)) - \mu}{v} > \frac{\gamma\left(\sqrt{N_s} - \sqrt{ML}\right)^2 - \mu}{v}\right)$$

$$= 1 - F_1\left(\frac{\gamma\left(\sqrt{N_s} - \sqrt{ML}\right)^2 - \mu}{v}\right)$$

In order to obtain $P_{fa} \leq P_0$, the threshold should be determined such that $$1 - F_1\left(\frac{\gamma\left(\sqrt{N_s} - \sqrt{ML}\right)^2 - \mu}{v}\right) \leq P_0$$

-continued

This leads to $$F_1\left(\frac{\gamma(\sqrt{N_s} - \sqrt{ML})^2 - \mu}{v}\right) \geq 1 - P_0$$

or, equivalently, $$\frac{\gamma(\sqrt{N_s} - \sqrt{ML})^2 - \mu}{v} \geq F_1^{-1}(1 - P_0)$$

From the definitions of $\mu$ and $v$, the threshold or the scaling factor $\gamma$ is determined according to the following equation:

$$\gamma \geq \gamma_0 = \frac{(\sqrt{N_s} + \sqrt{ML})^2}{(\sqrt{N_s} - \sqrt{ML})^2}\left(1 + \frac{(\sqrt{N_s} + \sqrt{ML})^{-2/3}}{(N_s ML)^{1/6}} F_1^{-1}(1 - P_0)\right) \quad (2)$$

For complex signal, the only difference is that the function $F_1$ should be replaced by $F_2$, the CDF of the Tracy-Wisdom distribution of order 2.

The Tracy-Wisdom distributions were found as the limiting law of the largest eigenvalue of certain random matrices. There is no closed form expression for the distribution functions. However, based on numerical computation, values of $F_1$ at some points are shown in Table 1 in Example 2 above. Table 1 can be used to compute the $F_1^{-1}(y)$ at certain points. For example, $F_1^{-1}(0.9)=0.45$, $F_1^{-1}(0.95)=0.98$.

Therefore, the threshold or the scaling factor $\gamma$ used in the embodiments of the invention including the Examples 1-4 as described above may be determined according to this section, wherein the equation of $\gamma$ may be slighted amended accordingly in different situations, e.g. as the equation (1) presented in Example 2 wherein the signal is received by a single receiver.

Simulations in a Multiple-Receiver System according to Example 4

In the following, signal to noise ratio (SNR) means the ratio of the average received signal power to the average noise power according to the equation:

$$SNR \stackrel{def}{=} \frac{E(\|x(n) - \eta(n)\|^2)}{E(\|\eta(n)\|^2)}$$

10000 samples are used for computing the sample covariance matrix. All the results are averaged over 1000 Monte Carlo realizations. The predetermined required probability of false alarm $P_{fa} \leq 0.1$ ($P_0=0.1$). Then the threshold $\gamma_0$ is determined based on equation (2) for the MME method. For comparison, the energy (EG) detection for the same system is also simulated.

For energy detection, the threshold is determined based on the theory as described e.g. in A. Sahai and D. Cabric, "Spectrum sensing: fundamental limits and practical challenges," in Dyspan 2005. The energy detection needs the noise power as a priori. Due to the noise uncertainty, the estimated noise power may be different from the real noise power. Let the estimated noise power be $\hat{\sigma}_\eta^2 = \alpha \rho_\eta^2$. Assume that $\alpha$ (in dB) is evenly distributed in an interval $[-B, B]$, wherein B is referred to as the noise uncertainty factor.

(1) Consider a 2-input 4-receiver system (M=4, P=2). The channel orders are $N_1=N_2=4$ (5 taps). The smoothing factor is chosen as L=5.

Figure 7:
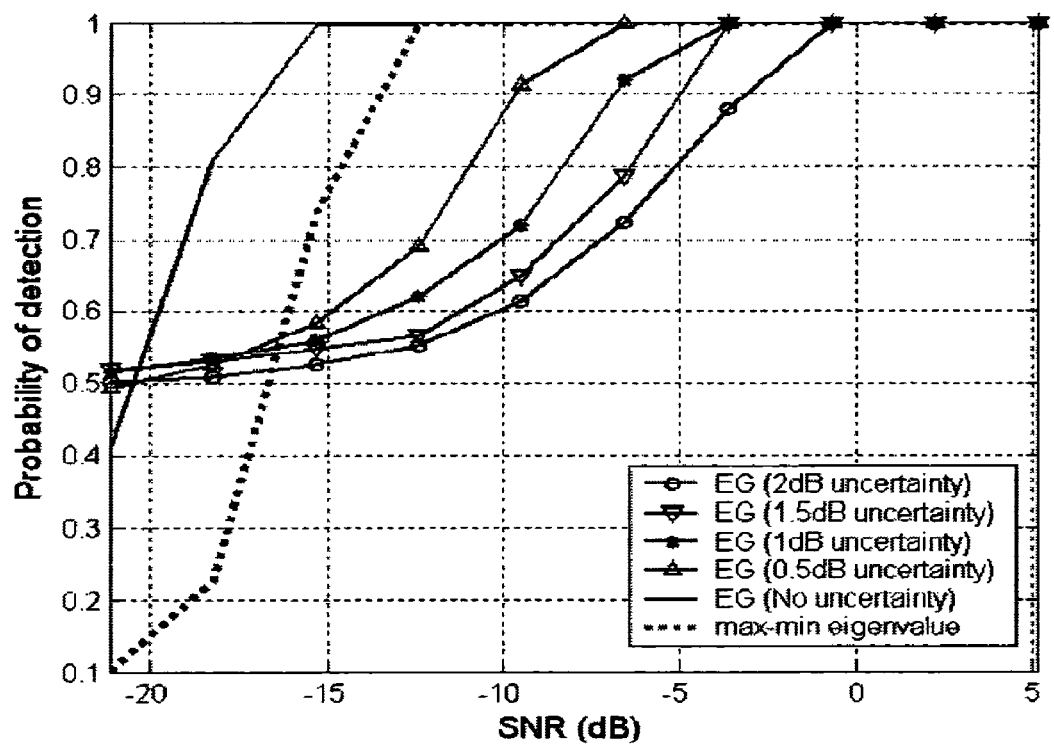
FIG. 7 shows the probability of detection resulting from the simulation in a multiple-input multiple-receiver system.

The probabilities of detection for the MME method and energy detection (with or without noise uncertainty) are shown in FIG. 7. If the noise variance is exactly known (B=0), the energy detection method has a good performance. The MME method is slightly worse than the energy detection method with ideal noise power (by about 3 dB). However, noise uncertainty is usually present. As shown in FIG. 7, if there is noise uncertainty (B>0), the energy detection is much worse than the method in accordance with the embodiment of the invention.

The probabilities of false alarm ($P_{fa}$) are shown in Table 4. As seen, the $P_{fa}$ for the MME method in accordance with the embodiment of the invention meets the requirement of $P_{fa} \leq 0.1$. The $P_{fa}$ for the energy detection without noise uncertainty is close to the required $P_{fa}$, but the $P_{fa}$ for the energy detection with noise uncertainty far exceeds the limit. This means that the energy detection is very unreliable in practical situations with noise uncertainty.

TABLE 4

Probabilities of false alarm (M = 4, P = 2)

| | | | method | | | |
|---|---|---|---|---|---|---|
| | EG (2 dB) | EG (1.5 dB) | EG (1 dB) | EG (0.5 dB) | EG (no uncertainty) | MME |
| $P_{fa}$ | 0.478 | 0.479 | 0.451 | 0.480 | 0.101 | 0.095 |

(2) Consider a single-input 2-receiver system (M=2, P=1). The channels have 8 taps. The smoothing factor is chosen as L=9.

Figure 8:
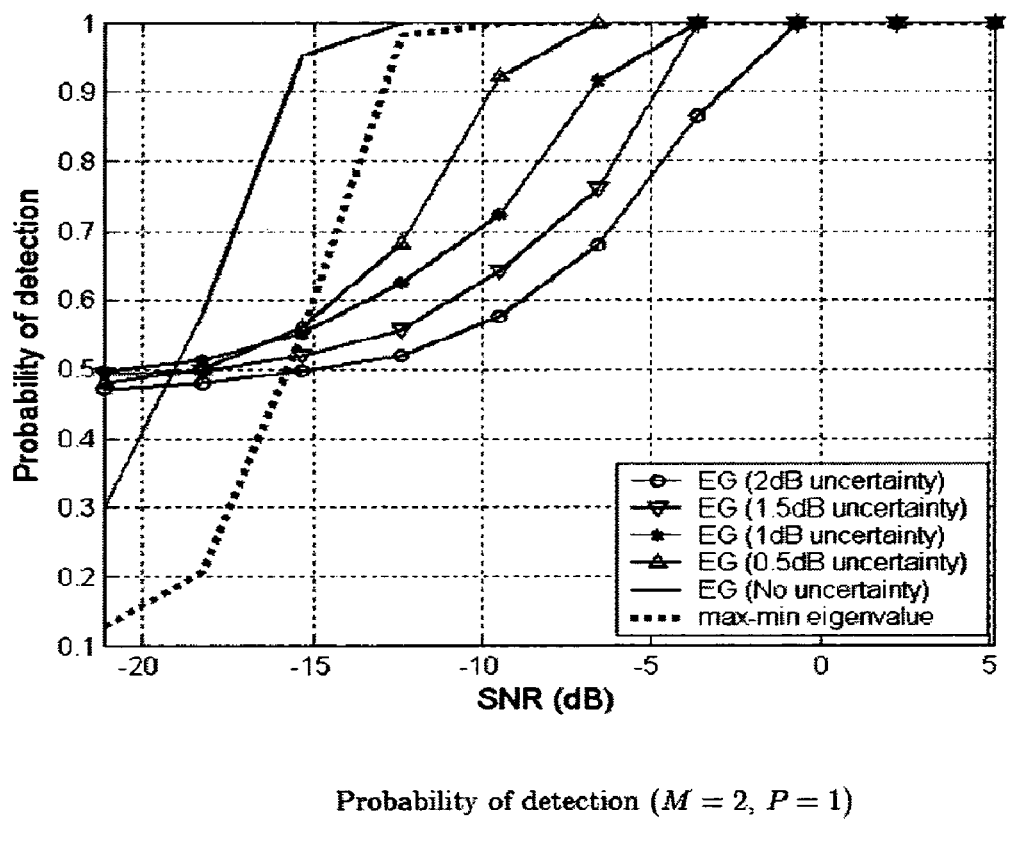
FIG. 8 shows the probability of detection resulting from the simulation in a single-input multiple-receiver system.

The probabilities of detection for the MME method and energy detection (with or without noise uncertainty) are shown in FIG. 8. The probabilities of false alarm are shown in Table 5. It is observed from FIG. 8 and Table 5 that the MME method in accordance with an embodiment of the invention has a better performance compared with the energy detection method.

TABLE 5

Probabilities of false alarm (M = 2, P = 1)

| | | | method | | | |
|---|---|---|---|---|---|---|
| | EG (2 dB) | EG (1.5 dB) | EG (1 dB) | EG (0.5 dB) | EG (no uncertainty) | MME |
| $P_{fa}$ | 0.479 | 0.474 | 0.441 | 0.473 | 0.094 | 0.098 |

Compared with coherent detection method, the eigenvalue based detection in accordance with the embodiments of the invention does not require any information on signal and do not need synchronization. The embodiments of the invention are also robust to multipath propagation. Compared with energy detection method, the embodiments of the invention is not influenced by the noise uncertainty, and achieves a better performance as shown in the simulation result above.

Thus, the embodiments of the invention are provided to sense or detect a signal without information of the signal, the channel, the noise level and SNR. The embodiments of the invention can be applied to all signals (e.g. DTV, wireless microphone, etc.). Furthermore, the same threshold or scaling factor can be used for all signals, since the threshold is independent from the signal and noise power. The embodiments of the invention also show a good performance with regard to the probability of detection and the probability of false alarm.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method carried out by a classifier circuit for classifying a received signal, the method comprising:
   determining a covariance matrix of signal values of the received signal;
   determining an eigenvalue matrix of the covariance matrix, the eigenvalue matrix comprising the eigenvalues of the covariance matrix;
   determine a first function from at least one eigenvalue of the eigenvalues of the covariance matrix wherein the first function comprises at least the maximum value of the eigenvalue matrix;
   determine a second function from at least one eigenvalue of the eigenvalues of the covariance matrix, wherein the second function is different from the first function; and
   classifying the received signal into a signal comprising data or into a noise signal dependent from a comparison between a value of the first function and a value of the second function.

2. The method of claim 1, wherein the covariance matrix $R(N_S)$ of signal values $x(n)$ of the received signal is determined according to the following equation:

$$R(N_S) = \frac{1}{N_S} \sum_{n=0}^{N_S-1} \underline{x}(n)\underline{x}^H(n),$$

wherein $N_s$ denotes the number of signal values $\underline{x}(n)$ in the covariance matrix.

3. The method of claim 2, wherein the eigenvalue matrix $\underline{\tilde{R}}(N_S)$ is determined according to the following formula:

$$\underline{\tilde{R}}(N_S) = \underline{Q}^{-1}\underline{R}(N_S)\underline{Q}^{-H},$$

wherein Q denotes a Hermitian matrix.

4. The method of claim 1, wherein the eigenvalue matrix is determined by transforming the covariance matrix to the eigenvalue matrix.

5. The method of claim 1, wherein the first function is a combination of a plurality of the eigenvalues.

6. The method of claim 5, wherein the first function is a linear combination of a plurality of the eigenvalues.

7. The method of claim 1, wherein the first function comprises a predetermined number of the largest eigenvalues of the eigenvalue matrix.

8. The method of claim 1, wherein the determining the value of the first function comprises determining the trace of the eigenvalues of the eigenvalue matrix.

9. The method of claim 1, wherein the second function is a combination of a plurality of the eigenvalues.

10. The method of claim 9, wherein the second function is a linear combination of a plurality of the eigenvalues.

11. The method of claim 1, wherein the second function comprises at least the minimum eigenvalue of the eigenvalue matrix.

12. The method of claim 11, wherein the second function comprises a predetermined number of the smallest eigenvalues of the eigenvalue matrix.

13. The method of claim 1, wherein a scaling factor is used in the comparison between the value of the first function and the value of the second function.

14. A classifier to classify a received signal, the classifier comprising:
   a first determining circuit to determine a covariance matrix of signal values of the received signal;
   a second determining circuit to determine an eigenvalue matrix of the covariance matrix, the eigenvalue matrix comprising the eigenvalues of the covariance matrix;
   a third determining circuit to determine a first function from at least one eigenvalue of the eigenvalues of the covariance matrix wherein the first function comprises at least the maximum eigenvalue of the eigenvalue matrix;
   a fourth determining circuit to determine a second function from at least one eigenvalue of the eigenvalues of the covariance matrix, wherein the second function is different from the first function; and
   a classifier circuit to classify the received signal into a signal comprising data or into a noise signal dependent from a comparison between a value of the first function and a value of the second function.

15. The classifier of claim 14, wherein the first determining circuit is configured to determine the covariance matrix $R(N_S)$ of signal values $\underline{x}(n)$ of the received signal according to the following equation:

$$R(N_S) = \frac{1}{N_S} \sum_{n=0}^{N_S-1} \underline{x}(n)\underline{x}^H(n),$$

wherein $N_S$ denotes the number of signal values $\underline{x}(n)$ in the covariance matrix.

16. The classifier of claim 15, wherein the second determining circuit is configured to determine the eigenvalue matrix $\underline{\tilde{R}}(N_S)$ according to the following formula:

$$\underline{\tilde{R}}(N_S) = \underline{Q}^{-1}\underline{R}(N_S)\underline{Q}^{-H},$$

wherein Q denotes a Hermitian matrix.

17. The classifier of claim 14, wherein the second determining circuit is configured to determine the eigenvalue matrix by transforming the covariance matrix to the eigenvalue matrix.

18. The classifier of claim 14, wherein the first function is a combination of a plurality of the eigenvalues.

19. The classifier of claim 18, wherein the first function is a linear combination of a plurality of the eigenvalues.

20. The classifier of claim 14, wherein the first function comprises a predetermined number of the largest eigenvalues of the eigenvalue matrix.

21. The classifier of claim 14, wherein the third determining circuit is configured to determine the value of the first function using the trace of the eigenvalues of the eigenvalue matrix.

22. The classifier of claim 14, wherein the second function is a combination of a plurality of the eigenvalues.

23. The classifier of claim 22, wherein the second function is a linear combination of a plurality of the eigenvalues.

24. The classifier of claim 14, wherein the second function comprises at least the minimum eigenvalue of the eigenvalue matrix.

25. The classifier of claim 24, wherein the second function comprises a predetermined number of the smallest eigenvalues of the eigenvalue matrix.

26. The classifier of claim 14, wherein the classifier circuit is configured to use a scaling factor in the comparison between the value of the first function and the value of the second function.

* * * * *